United States Patent [19]
Knight et al.

[11] Patent Number: 5,385,403
[45] Date of Patent: * Jan. 31, 1995

[54] MIXING APPARATUS FOR MIXING MATERIALS

[75] Inventors: William S. Knight; Stanley W. Knight; William M. Saunders, all of Brodhead; Ric S. Joranlien, Monroe, all of Wis.

[73] Assignee: Knight Manufacturing Corp., Brodhhead, Wis.

[*] Notice: The portion of the term of this patent subsequent to Jan. 4, 2011 has been disclaimed.

[21] Appl. No.: 165,108
[22] Filed: Dec. 10, 1993

Related U.S. Application Data

[63] Continuation-in-part of Ser. No. 154,581, Nov. 18, 1993, which is a continuation-in-part of Ser. No. 56,568, May 3, 1993, Pat. No. 5,275,335, which is a continuation of Ser. No. 831,835, Feb. 6, 1992, abandoned.

[51] Int. Cl.$^6$ .............................................. A01C 15/00
[52] U.S. Cl. .................... 366/297; 366/320; 366/603; 239/675; 239/683
[58] Field of Search ........ 239/675, 683, 672, 679–681; 366/603, 297, 329, 300, 186, 320

[56] References Cited

U.S. PATENT DOCUMENTS

| | | | |
|---|---|---|---|
| 3,037,780 | 6/1962 | Skronne et al. | 239/670 |
| 3,084,942 | 4/1963 | Kucera | 239/658 |
| 3,090,605 | 5/1963 | Copeland et al. | 366/298 |
| 3,155,288 | 11/1964 | Landgraf | 222/227 |
| 3,303,917 | 2/1967 | Wilkes et al. | 361/106 |
| 3,420,452 | 1/1969 | Vaughan | 239/670 |
| 3,478,970 | 11/1969 | Silversson et al. | 239/687 |
| 3,706,442 | 12/1972 | Peat | 366/186 |
| 3,797,807 | 3/1974 | Bebrens | 366/186 |
| 3,995,836 | 12/1976 | Carter et al. | 366/603 |
| 3,997,118 | 12/1976 | Bedwell et al. | 239/675 |
| 4,185,782 | 1/1980 | Belrose | 239/663 |
| 4,206,841 | 6/1980 | Lundgren | 198/670 |
| 4,362,272 | 12/1982 | Martin | 239/7 |
| 4,467,967 | 8/1984 | Martin | 239/662 |
| 4,473,184 | 9/1984 | Martin | 239/7 |
| 4,475,692 | 10/1984 | Walley | 239/662 |
| 4,480,927 | 11/1984 | Peat et al. | 366/603 |
| 4,528,098 | 7/1985 | Treysaac et al. | 210/414 |
| 4,720,047 | 1/1988 | Knight et al. | 239/675 |
| 4,752,139 | 6/1988 | Hauck | 366/300 |

FOREIGN PATENT DOCUMENTS

| | | | |
|---|---|---|---|
| 0061436 | 9/1982 | European Pat. Off. | 239/675 |
| 729227 | 11/1942 | Germany | 366/186 |
| 2028151 | 3/1980 | United Kingdom | 366/603 |
| 2030463 | 4/1980 | United Kingdom | 366/300 |

OTHER PUBLICATIONS

Slinger 700 series Ref. 5204/201C/3P/1090, Pub. 1990, Knight Manufacturing Corp., Brodhead, Wis.
Slinger Sludge and Organic Waste Applicator, Ref. 5205/20KIP/0887, Pub. 1987, Knight Industrial Division, Brodhead, Wis.
Gehl Trade Publication No. 4424 286-107, Pub. 1986.
New Idea "Solids II Plus Spreaders", Form FH87-320, Pub. 198.
H&S Trade Publication "U-Twin", Pub. 1988, Jul.
Rex Souper Spreader Trade Publication, Pub. 1984.
K&K "Big John" Trade Publication.

*Primary Examiner*—Karen B. Merritt
*Attorney, Agent, or Firm*—David J. Archer

[57] ABSTRACT

A mixer apparatus is disclosed for mixing materials. The apparatus includes a container which defines an opening for the reception therein of the materials. The container also defines an outlet for the discharge therethrough of the materials. A rotatable feed auger is disposed within and co-operates with the container for feeding the materials through the container. The feed auger has an axis of rotation which extends through the container. A rotatable mixing auger is disposed within the container and co-operates with the container and the feed auger for mixing the materials within the container. The mixing auger has a further axis of rotation which extends through the container. The further axis of rotation is disposed spaced and parallel relative to the axis of rotation of the feed auger. The container also includes a base which has a first portion which co-operates with the feed auger and a second portion which co-operates with the mixing auger. The second portion is disposed at a lower elevation relative to the first portion. The arrangement is such that when the feed auger and the mixing auger are rotating, all the materials within the container are fed at a substantially constant flow rate within the container.

10 Claims, 2 Drawing Sheets

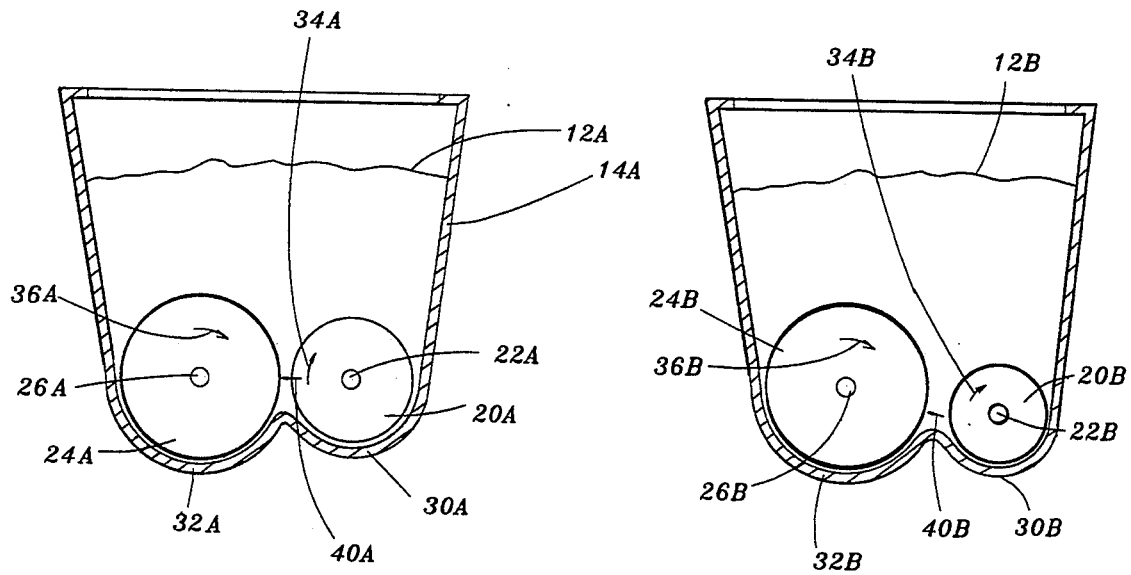
Fig. 3.
Fig. 4.
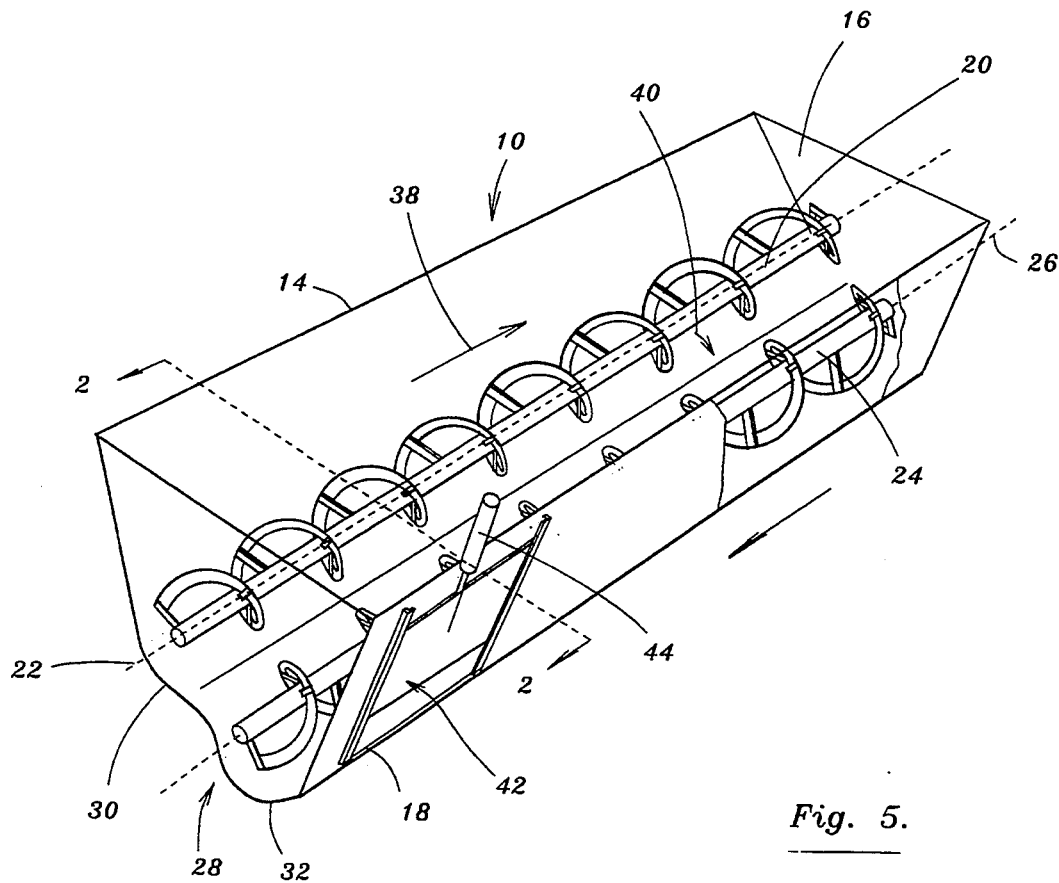
Fig. 5.

MIXING APPARATUS FOR MIXING MATERIALS

CROSS REFERENCE TO RELATED APPLICATIONS

This application is a continuation-in-part of co-pending application Ser. No. 08/154,581 filed Nov. 18, 1993 which is a continuation-in-part of application Ser. No. 08/056,568 filed May 3, 1993, now U.S. Pat. No. 5,275,335, which is a FWC of 07/831,835 filed Feb. 6, 1992 now abandoned. All the subject matter of the above applications are incorporated herein by reference.

BACKGROUND OF THE INVENTION

1. Field of the Invention

The present invention relates to a mixer apparatus for mixing materials. More specifically, the present invention relates to a mixing apparatus for mixing hay, cottonseed, protein, barley, grass seed, dirt and the like.

2. Information Disclosure Statement.

On most farms there exists a need for a mixer for mixing together various foodstuffs such as hay and the like together with feed supplements and vitamin concentrates.

Consequently, it is essential that such materials be thoroughly mixed so that each animal is fed with the same proportion of the feed supplement.

Also, it is essential that if medication is to be supplied to for example, a herd of cattle, such medication should be thoroughly mixed with the basic feedstuff so that each animal ingests the required medication.

Therefore, it is a primary objective of the present invention to provide a mixer apparatus which enables the rapid and thorough mixing of materials so that feed additives are evenly distributed throughout the resultant mixed feed.

Additionally, it is an objective of the present invention to provide an apparatus that enables a thorough and rapid mixing together of for example, grass seed with dirt. The arrangement is such that when such mixture is spread over the ground to be seeded, the grass grown will not be patchy but will be relatively evenly distributed over the seeded ground.

Another object of the present invention is the provision of a mixer apparatus in which the rate of the flow of the materials through the mixer is maintained fairly constant such that a thorough mixing of the materials is achieved.

Other objects and advantages of the present invention will be readily apparent to those skilled in the art by a consideration of the detailed description contained hereinafter taken in conjunction with the annexed drawings.

SUMMARY OF THE INVENTION

The present invention relates to a mixing apparatus for mixing materials. The apparatus includes a container which defines an opening for the reception therein of the materials. The container also defines an outlet for the discharge therethrough of the materials. A rotatable feed means is disposed within and co-operates with the container for feeding the materials through the container. The feed means has an axis of rotation which extends through the container.

A rotatable mixing means is disposed within the container and co-operates with the container and the feed means for mixing the materials within the container. The mixing means has a further axis of rotation which extends through the container. The further axis of rotation is disposed spaced and parallel relative to the axis of rotation of the feed means.

Additionally, the container includes a base having a first portion which co-operates with the feed means. The base also includes a second portion which co-operates with the mixing means. The second portion is disposed at a lower elevation relative to the first portion. The arrangement is such that when the feed means and the mixing means are rotating, all the materials within the container are fed at a substantially constant rate within the container.

Many modifications and variations of the present invention will be readily apparent to those skilled in the art by a consideration of the detailed description contained hereinafter. However, such variations and modifications do not depart from the spirit and scope of the present invention as defined by the appended claims.

BRIEF DESCRIPTION OF THE DRAWINGS

FIG. 3 is a similar view to that shown in FIG. 2 but shows the feed means having a smaller diameter than the diameter of the mixing means and with the axis of rotation of both the feed means and the mixing means being at the same elevation;

FIG. 4 is a similar view to that shown in FIG. 2 but shows another embodiment of the present invention in which the feed means has a smaller diameter than the mixing means but in which the axis of rotation of the feed means is disposed below the further axis of rotation of the mixing means; and FIG. 5 is a similar view to that shown in FIG. 1 but shows the closure in the open second location thereof.

Similar reference characters refer to similar parts throughout the various views of the drawings.

DESCRIPTION OF THE DRAWINGS

Figure 1:
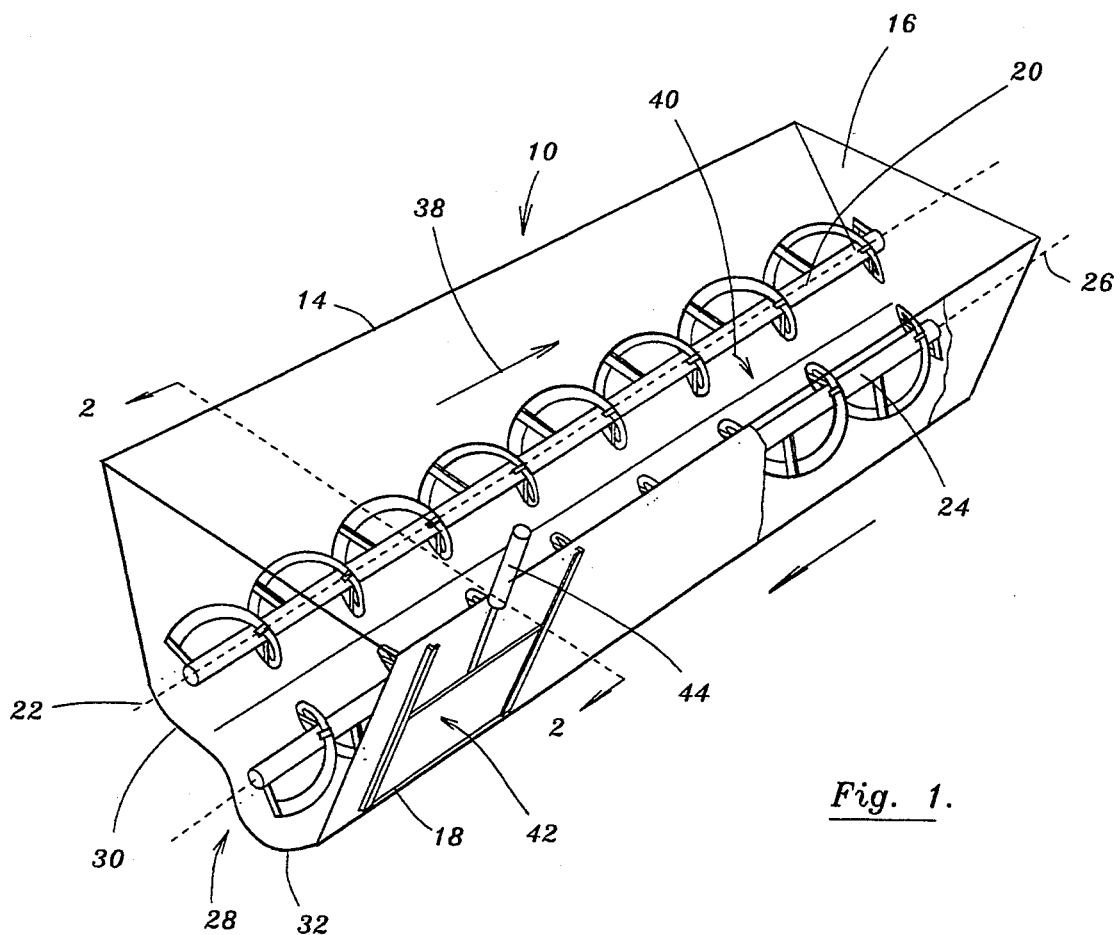
FIG. 1 is a perspective view of the mixer apparatus according to the present invention.
Figure 2:
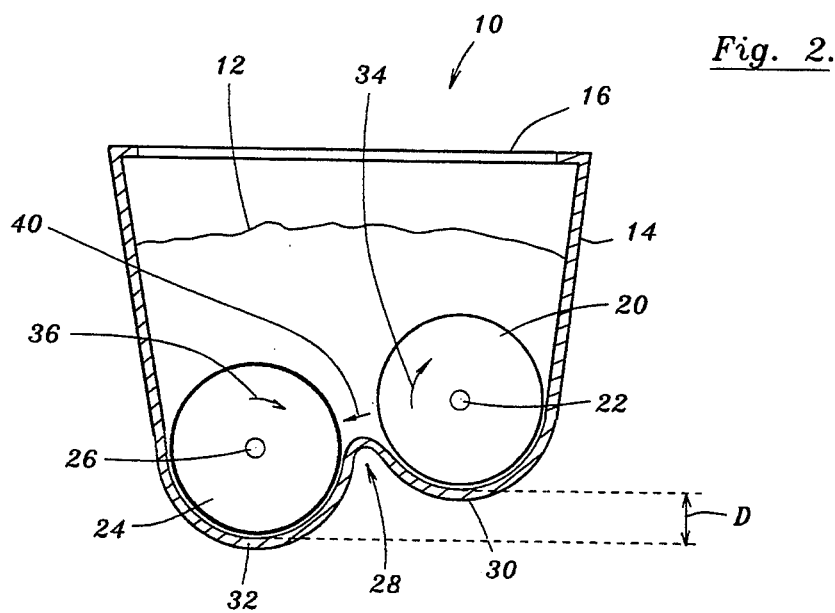
FIG. 2 is a view taken on the line 2—2 of FIG. 1 showing the second portion being disposed at a lower elevation relative to the first portion and with the feed means and the mixing means both having the same diameters.

FIGS. 1 and 2 show a mixer apparatus generally designated 10 for mixing materials 12. The apparatus 10 includes a container 14 which defines an opening 16 therein for the reception therein of the materials 12. The container 14 also defines an outlet 18 for the discharge therethrough of the materials 12.

A rotatable feed means 20 is disposed within and co-operates with the container 14 for feeding the materials 12 through the container 14. The feed means 20 has an axis of rotation 22 which extends through the container 14.

A rotatable mixing means 24 is disposed within the container 14 and co-operates with the container 14 and the feed means 20 for mixing the materials 12 within the container 14. The mixing means 24 has a further axis of rotation 26 which extends through the container 14. The further axis of rotation 26 is disposed spaced and parallel relative to the axis of rotation 22 of the feed means 20.

The container 14 also includes a base 28 having a first portion 30 which co-operates with the feed means 20.

The base 28 also includes a second portion 32 which co-operates with the mixing means 24. The second portion 32 is disposed at a lower elevation relative to the first portion 30. The difference in elevation between the first and second portions 30 and 32 is indicated as the distance D. The arrangement is such that when the feed means 20 and the mixing means 24 are rotated as indicated by the arrows 34 and 36, all the materials 12 within the container 14 are fed at a substantially constant rate within the container 14.

As shown in FIGS. 1 & 2, the further axis of rotation 26 is disposed below the axis of rotation 22 of the feed means 20.

However, FIG. 3 shows a further embodiment of the present invention in which the further axis of rotation 26A is disposed at the same elevation as the axis of rotation 22A of the feed means 20A.

FIG. 4 shows another embodiment of the present invention in which the further axis of rotation 26B is disposed above the axis of rotation 22B of the feed means 20B. However, in each of the aforementioned embodiments, the second portion 32,32A, and 32B is disposed at a lower elevation relative to the first portion 30,30A and 30B. The arrangement in each embodiment is such that as the materials 12,12A and 12B are being moved by the feed means 20, 20A and 20B and the mixing means 24, 24A and 24B, when voids in the materials are present as the mixing means moves the materials along the container, the feed means tends to fill such voids by radial movement of the materials away from the feed means into direct mesh with the materials being moved by the mixing means. In this manner, the flow rate of materials within the mixer apparatus remains relatively constant and there is a thorough mixing and a rapid mixing of materials within the mixer apparatus.

In a more specific embodiment of the present invention, the first portion 30,30A and 30B is disposed within a range 1 to 50 inches higher than the second portion 32, 32A and 32B.

Also, the feed means and the mixing means in each of the aforementioned embodiments have diameters which are respectively within a range 5 to 100 inches.

In each of the embodiments of FIGS. 1-4, the second portion 32, 32A and 32B co-operates with the mixing means 24, 24A and 24B and the second portion is disposed at a lower elevation relative to the first portion. The arrangement is such that when the feed means 20, 20A and 20B and the mixing means 24, 24A and 24B are rotating, all the materials within the container are fed at a substantially constant rate. The materials are fed through the container partially due to an interaction between the feed means 20, 20A and 20B and the first portion 30, 30A and 30B. The materials 12, 12A and 12B are also moved partially by an interaction of the mixing means 24, 24A and 24B and the second portion 32, 32A and 32B.

Additionally, the materials are fed by the feed means in a first direction as indicated by the arrow 38 in FIG. 1 parallel to the axis of rotation 22 and in a second direction as indicated by the further arrow 40 radially away from the feed means 20.

More specifically, all the materials 12 within the container 14 are fed at a substantially constant rate with the materials being fed in the first direction 38 substantially parallel to the axis of rotation 22 of the feed means 20. However, the feed means 20 also imparts a substantially radial component to the materials as indicated by the further arrow 40 such that any voids in the materials 12 being moved by the mixing means 24 are automatically filled by such radial flow component 40 thereby enhancing the thorough and rapid mixing of the materials 12.

The aforementioned feeding in the direction 38 and 40 is also present in the all of the alternative embodiments shown in FIGS. 3 and 4.

Additionally, the container 14 further includes closure means generally designated 42 shown in FIG. 1. The closure means 42 co-operate with the outlet 18 for selectively closing the outlet 18.

Means 44 are connected to the closure means 42 for moving the closure means 42 from a first location shown in FIG. 1 in which the outlet 18 is closed to a second location as shown in FIG. 5 in which the outlet 18 is open. The arrangement is such that when the apparatus 10 is in operation, and when the feed and mixing means 20 and 24 respectively are rotating, the closure means 42 is disposed in the first location as shown in FIG. 1.

More particularly, as shown in FIGS. 1 and 5, the closure means 44 is a hydraulic ram which is anchored at one end thereof to the container 14 and at the other end to the closure means 42 which is a sliding shutter. The shutter is guided at the sides thereof by channels so that the ram moves the shutter from the closed to the open position as shown respectively in FIGS. 1 and 5.

In operation of the mixer apparatus 10, the outlet 18 is closed by the closure means 42 and the materials 12 to be mixed are fed through the opening 16. The feed means 20 and the mixing means 24 are then rotated. Accordingly, there exists a tendency for the materials 12 within the container 14 to move in the direction of the arrows 34 and 36 so that the materials 12 flow generally in a circular flow path when viewed from the top of the container. However, when voids in the materials 12 exist as the materials 12 are moved by the mixing means 24 in the direction shown by the arrow 36, there exists a tendency for materials 12 being fed by the feed means 20 to be moved radially away from the feed means 20 directly into mesh with the mixing means 24 such that the aforementioned voids are filled. By this means, a thorough mixing and a rapid mixing of the materials is achieved.

It will be readily understood by those skilled in the art that the feed means 20, 20A and 20B and the mixing means 24, 24A and 24B may include augers having ribbon type flights welded thereon for moving and mixing the materials. Such flights will be generally of helical configuration. Alternatively, the augers may include a helical flight which extends continuously from the center shaft to which the flight is welded.

Also, the present invention is equally carried out by the provision of non continuous paddles spaced relative to each other in a helical path as is well known in the art.

As stated hereinbefore, such mixing can also be accomplished by the use of vanes or paddles arranged in a substantially helical configuration.

Also, it will be understood by those skilled in the art that the present invention also envisages control means for varying the relative rotational speed of the feed means and the mixing means and that the diameters respectively of the feed and mixing means may be varied. However, an important feature of the present invention is the provision of the base of the container having a first portion 30 which co-operates with the feed means 20 and closely follows that sector of the periphery of the feed means 20 and a second portion 32 which closely follows and co-operates with a sector of the periphery of the mixing means 24 with the second portion 32 being disposed at a lower elevation relative to the first portion 30. When the mixing operation has been completed, the closure means 42 is moved to the second location thereof as shown in FIG. 5 such that the mixed materials may be moved from the container 14.

Also, although the present invention is particularly suitable for towing behind a tractor, the mixer being driven by a power take off, the present invention also envisages a mixer apparatus located on the back of a truck or the like. Furthermore, the present invention includes an arrangement in which the mixer apparatus is stationary.

Additionally, it will be understood that the present invention includes any relative rotation of the feed and mixer augers. For example, by reversing the spiral configuration of one of the augers, such would have a similar effect to reversing the direction of rotation of that auger.

The present invention provides a relatively inexpensive means for thoroughly and rapidly mixing materials within a container.

What is claimed is:

1. A mixing apparatus for mixing materials, said apparatus comprising:
  a container defining an opening for the reception therein of the materials, said container also defining an outlet for the discharge therethrough of the materials;
  a rotatable feed means disposed within and co-operating with said container for feeding the materials through said container, said feed means having an axis of rotation extending through said container;
  a rotatable mixing means disposed within said container and co-operating with said container and said feed means for mixing the materials within said container, said mixing means having a further axis of rotation extending through said container, said further axis of rotation being disposed spaced and parallel relative to said axis of rotation of said feed means;
  said container further including:
  a base;
  said base including:
  a first portion which co-operates with said feed means; and
  a second portion which co-operates with said mixing means, said second portion being disposed at a lower elevation relative to said first portion, the arrangement being such that when said feed means and said mixing means are rotating and when a residue of the materials is disposed adjacent to said first portion, rotation of said feed and mixing means moves said residue in a direction from said first portion immediately towards said second portion, said feed and mixer means being circumferentially spaced relative to each other, the materials being fed by said feed means from said feed means to said mixing means even when the level of the materials drops below the top of said mixing means so that all of the materials within said container are fed at a substantially constant flow rate within said container.

2. A mixing apparatus as set forth in claim 1 wherein said further axis of rotation is disposed below said axis of rotation of said feed means.

3. A mixing apparatus as set forth in claim 1 wherein said further axis of rotation is disposed at the same elevation as said axis of rotation of said feed means.

4. A mixing apparatus as set forth in claim 1 wherein said further axis of rotation is disposed above said axis of rotation of said feed means.

5. A mixing apparatus as set forth in claim 1 wherein said first portion is disposed within a range 1 to 50 inches higher than said second portion.

6. A mixing apparatus as set forth in claim 5 wherein said feed means and said mixing means have diameters which are respectively within a range 5 to 100 inches.

7. A mixing apparatus as set forth in claim 1 wherein said container further includes:
  closure means which co-operate with said outlet for selectively closing said outlet;
  means connected to said closure means for moving said closure means from a first location in which said outlet is closed to a second location in which said outlet is open so that when said apparatus is in operation and when said feed and mixing means are rotating, said closure means is disposed in said first location.

8. A mixing apparatus for materials, said apparatus comprising:
  a container defining an opening for the reception therein of the materials, said container also defining an outlet for the discharge therethrough of the mixed materials;
  a rotatable feed means disposed within and co-operating with said container for feeding the materials through said container, said feed means having an axis of rotation extending through said container;
  a rotatable mixing means disposed within said container and co-operating with said container and said feed means for mixing the materials within said container, said mixing means having a further axis of rotation extending through said container, said further axis of rotation being disposed spaced and parallel relative to said axis of rotation of said feed means;
  said container further including:
  a base;
  said base including:
  a first portion which co-operates with said feed means; and
  a second portion which co-operates with said mixing means, said second portion being disposed at a lower elevation relative to said first portion, the arrangement being such that when said feed means and said mixing means are rotating and when a residue of the materials is disposed adjacent to said first portion, rotation of said feed and mixing means moves said residue in a direction from said first portion immediately towards said second portion, said feed and mixer means being circumferentially spaced relative to each other, the materials being fed by said feed means from said feed means to said mixing means even when the level of the materials drops below the top of said mixing means so that all of the materials within said container are fed at a substantially constant rate, the materials being fed through said container partially due to an interaction between said feed means and said first portion, the materials also being moved partially due to an interaction of said mixing means and said second portion.

9. A mixing apparatus for mixing materials, said apparatus comprising:

a container defining an opening for the reception therein of the materials, said container also defining an outlet for the discharge therethrough of the mixed materials;

a rotatable feed means disposed within and co-operating with said container for feeding the materials through said container, said feed means having an axis of rotation extending through said container;

a rotatable mixing means disposed within said container and co-operating with said container and said feed means for mixing the materials within said container, said mixing means having a further axis of rotation extending through said container, said further axis of rotation being disposed spaced and parallel relative to said axis of rotation of said feed means;

said container further including:

a base;

said base including:

a first portion which co-operates with said feed means; and a second portion which co-operates with said mixing means, said second portion being disposed at a lower elevation relative to said first portion, the arrangement being such that when said feed means and said mixing means are rotating and when a residue of the materials is disposed adjacent to said first portion, rotation of said feed and mixing means moves said residue in a direction from said first portion immediately towards said second portion, said feed and mixer means being circumferentially spaced relative to each other, the materials being fed by said feed means from said feed means to said mixing means even when the level of the materials drops below the top of said mixing means so that all of the materials within said container are fed at a substantially constant rate within said container, the materials being fed by said feed means in a first direction parallel to said axis of rotation and in a second direction radially away from said feed means.

10. A mixing apparatus for mixing materials, said apparatus comprising:

a container defining an opening for the reception therein of the materials, said container also defining an outlet for the discharge therethrough of the mixed materials;

a rotatable feed means disposed within and co-operating with said container for feeding the materials through said container, said feed means having an axis of rotation extending through said container;

a rotatable mixing means disposed within said container and co-operating with said container and said feed means for moving the materials through said container, said mixing means having a further axis of rotation extending through said container, said further axis of rotation being disposed spaced and parallel relative to said axis of rotation of said feed means;

said container further including:

a base;

said base including:

a first portion which co-operates with said feed means; and a second portion which co-operates with said mixing means, said second portion being disposed at a lower elevation relative to said first portion, the arrangement being such that when said feed means and said mixing means are rotating and when a residue of the materials is disposed adjacent to said first portion, rotation of said feed and mixing means moves said residue in a direction from said first portion immediately towards said second portion, said feed and mixer means being circumferentially spaced relative to each other, the materials being fed by said feed means from said feed means to said mixing means even when the level of the materials drops below the top of said mixing means so that all of the materials within said container are fed at a substantially constant rate the materials being fed in a first direction substantially parallel to said axis of rotation of said feed means, however, said feed means also imparting a substantially radial flow component to the materials such that any voids in the materials being moved by said mixing means are automatically filled by such radial flow component thereby enhancing the rapid and thorough mixing of the materials.

* * * * *